3,410,795
SLURRY FLOW CONTROL
George C. Blytas, Albany, and Ernest Robert Freitas, San Leandro, Calif., assignors to Shell Oil Company, New York, N.Y., a corporation of Delaware
Continuation-in-part of application Ser. No. 373,451, June 8, 1964. This application Mar. 17, 1967, Ser. No. 638,166
9 Claims. (Cl. 210—33)

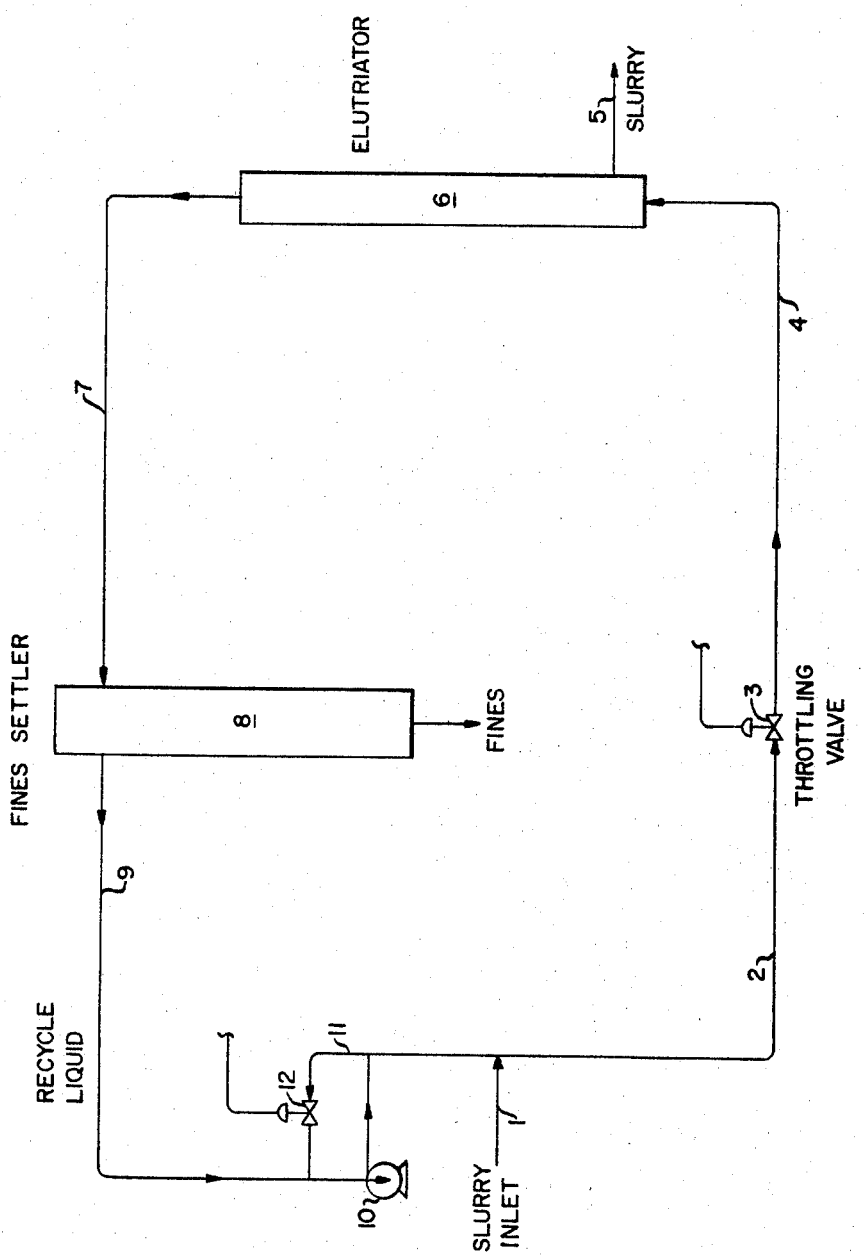

ABSTRACT OF THE DISCLOSURE

A method for regulating the transfer flow rate of a slurry in which the flow is controlled by introduction of the slurry into a circulating system where it is diluted with a recycle fluid, throttled and passed to a separation zone where the dilute slurry is separated into recycle fluid and reconcentrated slurry which is discharged from the system at the desired flow rate thus allowing flow control without the plugging and attrition associated with conventional throttling means. The separation zone may be used to separate solid fines from the slurry in which case solid fines are removed from the recycle fluid before the latter is recirculated.

Cross reference to related applications

This is a continuation-in-part of application Ser. No. 373,423 and application Ser. No. 373,451, both filed June 8, 1964, both now abandoned.

Background of the invention

This invention relates to a method of process control in a solid-fluid system. In particular, this invention relates to control of flow and removal of fines from a slurry system.

It is well known to employ slurries of particulate solids in fluid, especially liquid carriers, in various processes. For example, Broughton et al., U.S. 2,957,927, patented Oct. 25, 1960, teaches the separation of normal hydrocarbons from hydrocarbon mixtures with a slurry of a solid silicate suspended in a liquid organic amine. The removal of an adsorbable gas from a gas mixture with a charcoal-in-water slurry is described in Maslan, U.S. 2,823,765, patented Feb. 18, 1963. Marple et al., U.S. 2,768,942, patented Oct. 30, 1956, teaches an adsorptive distillation process employing a countercurrent slurry adsorbent. Slurries of solid catalysts, e.g., for conversion processes, mineral ores, crystals, pulps, abrasives, pigments, etc. are also used.

In some processes, for example, crystallization from a mother liquor, it is very difficult to avoid processing a slurry. In other processes, especially those using slurries for physical transportation of solids, e.g., ore processing, dilute concentrations of solids are employed to insure carrying free of plugging and hold-up. Although sorption and catalytic processes involving slurried solids overcome certain disadvantages inherent in fixed-bed processes, such as non-continuous operation and variation of product composition, they have not achieved widespread commercial use generally because of materials handling problems, such as flow control, solids attrition, etc. It is readily apparent that a slurry containing, e.g., 20–40% volume solids (i.e., percent of total slurry volume occupied by solids) cannot be metered through standard control valves without losses of efficiency and accuracy, plugging, and considerable wearing, chipping and breaking of solid particles.

Conventionally the flow of fluids are regulated by restrictions in the conduit containing the flowing medium, the most common restrictions being of course, control valves. However, when dealing with slurry systems containing substantial amounts of solids, conventional means are ill suited to the job. The physical obstructions in the valve, necessary to throttle the flow, result in practical problems which are difficult to overcome. Not only is the valve rapidly damaged by erosion, but the solids are often attrited to an unacceptable degree. Perhaps most serious however, is the problem of plugging. Most flow control devices introduce into the system physical obstructions which allow solids to accumulate and pack. As the solids accumulate and pack the conduit gradually becomes plugged. If the process of plugging is gradual, it is often overcome by increasing the driving pressure or reducing the mechanical restriction, as by opening the control valve. The system eventually becomes completely plugged and must be cleaned out or, as commonly happens, the plug suddenly breaks loose causing a surge in flow. The latter situation can in some cases have more serious consequences than plugging per se and prevents stable control of a circulating slurry system.

Thus, the problems associated with plugging the flow control device have perhaps been a major deterrent to extensive commercial use of circulating slurry processes.

Particle attrition incident to prior methods of flow control can result in the accumulation of fines, which are particles considerably smaller than most other particles in the slurry and are desirably removed from the system. Although some fines production is attributable to particle fracture resulating from strain induced in the solids by, e.g., heating-cooling or adsorption-desorption cycles, a major amount of fines production is caused by wearing and chipping of particles due to impact with other particles, pipe walls and equipment. Fines production increases as more concentrated slurries are used because of increased inter-particle contact. Breaking and chipping of particles is especially prevalent when a concentrated slurry passes through narrow apertures at relatively high velocities, such as through a manual or control valve.

Fines are generally undesirable constituents of most slurries for various reasons. In some processes wherein adsorbents or catalysts are used in slurries, a critical solid surface-to-volume ratio might be upset by the accumulation of fines; in other systems fines build up as hard deposits and cause plugging. Maintenance of a low amount of fines in the system is especially important in countercurrent processes (i.e., where the solid flows countercurrent to the net liquid flow), since it is essential to maintain a certain minimum settling rate for the solid particles.

Summary of the invention

It has now been discovered that an effective method of flow control in slurry systems comprises in sequence (1) diluting the slurry with recycle fluid, (2) regulating the flow of the diluted slurry, (3) separating the slurry into reconcentrated slurry and recycle fluid, (4) returning the recycle fluid for use in diluting more slurry in step (1). In one advantageous embodiment fines may be removed into the recycle fluid in step (3) and the recycle fluid separated from the fines before recycle. This combination of process steps is particularly advantageous for several reasons. As indicated above, even coarse flow control of slurries containing more than about 3–5% volume solids may be very difficult, even with special equipment such as elastic diaphragm valves, because of frequent plugging of the valves. Although this problem could be eliminated through the use of a more dilute slurry throughout the process, higher costs and lower process efficiencies would result. The present invention obviates plugging by the use of a recycle stream of carrier fluid which effectively dilutes the slurry for the purpose of flow control, but returns a concentrated slurry to the process. Substantial dilution of the slurry together with flow control and throttling provides sufficient turbulence to the system to prevent plug formation. The excess liquid together with the substantial increase in flow produced by inclusion of the diluent coupled with the resulting low concentration of solids prevents plugging of restrictions in the system and allows smooth and stable flow control. Moreover, variation in diluent flow provides a means for slurry flow control independent of the throttling valve or device.

By "flow control" as used herein is meant the rate of transfer of slurry from one point to another, that is, the regulation of transfer rate between, for example, one process unit section and another. The control is independent of the conditions of slurry concentration and pressure in the processing units. While the existing pressure differential between the points of transfer and the physical nature of the system set the maximum flow, regulation of flow below maximum is achieved by means of the circulating system of the invention. Thus, the circulating recycle fluid serves two functions: dilution of the slurry and as a means of regulating pressure drop between points of transfer. Variation in recycle fluid circulation rate provides a means of producing flow regulating pressure drop independent of throttling. For example, in a system of fixed throttling restriction, the transfer of process slurry through the circulating control system can be controlled by variation in recycle flow. If it is desired to slow down the transfer of slurry, recycle rate is increased. The increased total flow results in higher pressure drop in the circuit and net slurry flow is reduced. Conversely if greater slurry flow is desired, the recycle rate is reduced. The invention allows regulation of slurry flow independent of the pressure and slurry concentration of the points of transfer. Thus, while the control system involves dilution, recirculation and reconcentration, it does not require changes in the slurry or operating conditions of the points of transfer. In this respect it is like any other flow control device. Unlike other methods of slurry flow control it minimizes the problems of attrition and plugging, and control may be varied by varying recycle rate with varying the throttling restriction.

Controlling the flow of diluted slurry provides the further advantage of reducing the amount of fines produced by particle attrition, incident to passing concentrated slurries through small, irregular passageways of standard control valve or devices. Although the process of the invention is particularly applicable to slurries of solids in liquid carriers, it is also applicable to solid-gas systems. Therefore, the term "slurry" is intended to mean solid-fluid mixtures, including both solid-liquid and solid-gas mixtures. For convenience, the invention will be discussed in terms of solid-liquid slurries.

In one embodiment the present combination of process steps provides a very convenient method for removal of fines from systems where fines removal is desired. The solids-disengaging, or slurry-reconcentrating step is easily operated in such a manner as to allow at least a portion of the fines to pass out with recycle liquid, from which they or a portion of them are removed by settling or filtering. Fines as discussed herein are particles which are considerably smaller than most other particles in the slurry and which are desirably removed from the system. Generally, fines have a settling velocity in the liquid carrier of less than 10 cm./sec., preferably less than 3 cm./sec., although this figure may vary widely with the size of particles and type of process involved. For many common applications, the fines are solid particles which pass through a 65 mesh (210 Tyler) sieve. The present process allows removal of these fines without an additional separation of fines from larger particles, said separation being in the present case incidental to the reconcentration step.

The fines which are removed from the recycle stream prior to the addition of the recycle stream to the slurry are produced by attrition, which is herein defined to be the production of smaller from larger particles, e.g., by wear, chipping or breaking. Attrition is experienced in all slurry processes, and is generally attributable either to particle impact with other particles, walls and equipment, or to particle fracture resulting from strain induced in the solids by, eg., heating and cooling, or adsorption and desorption. Fines are desirably removed from slurries for various reasons as discussed above.

Dilution of the slurry prior to flow regulation may be done in a separate vessel but is preferably carried out directly in a pipeline. In general, slurries useful in various processes contain from about 3% to about 55%, preferably 7% to about 40% by volume solids. In accord with the invention, these slurries are diluted to from 1–20%, preferably 2–15% by volume solids, depending on the total flow of solids desired, and type of particles and process concerned. It is the appreciable dilution which allows stable and efficient flow control.

As mentioned above, the invention is applicable to any process employing a solid-fluid slurry. The solid material may comprise chemically reactive or inert materials, such as sorbents, catalysts, abrasives, crystals, ores and pigments. Many solids, such as mined ores, wood, sand, shale, and coal are slurried to provide convenient methods of transporting the solid material. Other solids often found in slurries are chemicals supported on inert carriers, solid clathrates, chelates, and other solid chemical complexes. Preferred solids are catalysts and adsorbents; adsorbents include, for example, silica gel, metalloaluminum silicates ("molecular sieves"), activated carbon, charcoal, and natural or synthetic zeolites. Catalysts include aluminum chloride, supported metal catalysts, etc. Particle diameters are generally at least 5 microns, preferably 10 microns to 50 mm., especially 100 microns to 10 mm. Liquid carriers may be water, organic amines, aromatic and/or aliphatic hydrocarbons, molten salts, solvents, etc.

Flow control may generally be effected in a throttling zone, comprising any device for restricting the flow in the line. Manual or automatic control valves, orifices, or coils are suitable. Although it is possible, when using a diluted slurry, to effect complete control of the flow by the throttling step, it is preferred to effect only coarse (i.e., manual) control of the flow in the throttling step, and to effect close control of the slurry flow by adjusting the flow rate of the recycle stream. At a given valve opening, the pressure drop is substantially controlled by the total flow of slurry plus recycle liquid. Thus, at a given pressure drop, the slurry rate is readily controlled by regulating the rate of the recycle stream, since the total rate remains substantially constant.

While the use of a throttling valve is desirable in many cases to obtain more flexibility of control, there is some advantage for use of a fixed throttling zone such as a coil. It is a well founded principle that the pressure drop in a coil depends upon the dimensions, i.e., its length and cross sectional area, the radius of curvature, and the nature of the fluid flowing through the coil. Conversely, the flow depends upon the pressure drop.

When the radius of curvature of coil is about 5 or more times that of the conduit diameter itself, the pressure drop effected by a given length of coiled conduit is about twice that which would result from the same length of uncoiled conduit. When the radius of curvature of the conduit is less than about 5 times the conduit diameter, the pressure drop increases sharply. For a given coil the pressure drop across the coil can be regulated by the amount of flow through the coil. Therefore, the amount of diluent circulated can be used as a direct means for controlling the pressure drop and consequently the transfer of concentrated slurry drawn into and taken out of the circulating flow control system.

Slurry reconcentration is continuously carried out, subsequent to throttling, in a solids-disengaging zone. This zone concentrates the slurry usually to essentially the same concentration as before dilution, and yields a slurry stream and a stream of liquid (recycle liquid) which may contain fines, including fines which may have resulted from the turbulence caused by the throttling device. It is desirable to remove fines at the same rate that they are produced in the overall slurry system; fines may be removed at more than one location in the system, of course. Any known solids-concentration device is acceptable as the solids-disengaging zone, for instance, centrifuges, filters, cyclones or elutriators. Elutriators are devices which permit slow upward flow of liquid, heavier solids settling to the bottom and being drawn off as a concentrated slurry. Separated liquid and entrained fines are drawn off at the top of the elutriator. A simple form of an elutriator is exemplified by a vertical pipe with an outlet near the bottom for withdrawing concentrated slurry. Dilute slurry enters the bottom of the pipe; liquid and fines flow from the top. The rate of upward flow of liquid in the elutriator is determined by the settling rate of the fines desirably removed; the flow rate must be greater than the settling velocity of the largest particle to be carried overhead. Although several devices are available for slurry concentration, it is essential to carry out this step continuously to maintain flow control.

Recycle liquid with entrained fines passes from the slurry concentration step to a fines removal step. The removal of very small particles may be carried out in any conventional and well established manner, for instance, by settling, centrifugation, or filtration. After removal of at least part of the fines, the recycle liquid is reused for dilution of incoming slurry. Where fines removal is not carried out, the diluent may be stored in a surge or hold-up vessel before being recirculated as diluent.

Description of drawing and specific embodiment

A specific example of the flow-control method of the invention with fines removal is illustrated in the drawing. Referring to the drawing, slurry (from a main process) consisting of about 25% volume solids passes from slurry inlet 1 into line 2, where it is diluted with recycle liquid to form a diluted slurry of about 6% volume solids. Diluted slurry passes through line 2 and manual throttling valve 3, which is used for a coarse control of the flow; i.e., to set the total flow of slurry plus recycle liquid. A controlled amount of diluted slurry passes through line 4 and into elutriator 6, wherein the slurry is continuously reconcentrated to about 25% volume solids, essentially the same solids concentration as the slurry entering line 1. Liquid and fines if any pass upward at the rate of about 0.1 ft./sec.; concentrated slurry is withdrawn near the bottom of the elutriator and is passed to another process step. Recycle liquid and entrained fines pass from the elutriator through line 7 to a fines settler, which is a large vessel with a means for removing settled particles near the bottom. Recycle liquid is withdrawn near the top of the fines settler and is passed through line 9 and pump 10 and is returned to line 2 where it again dilutes incoming slurry. The flow of recycle liquid is adjusted by automatically controlling with control valve 12 the amount of liquid flowing through pump bypass 11; e.g., when valve 12 is closed, greater amounts of recycle liquid flow into line 2, thereby reducing slurry flow. Where fines removal is not required or desired, a settler may be substituted for the elutriator for solid/liquid separation. Operating flow rates would be more flexible for the slurry settler and the surge vessel.

As mentioned above, the combination fines-removal and flow control scheme of the invention may be broadly applied to any process wherein a solid-fluid slurry containing more than about 3% volume solids is employed. The invention is particularly applicable to sorption processes wherein the solid acts as a selective sorbent for one or more compounds desirably removed or separated from a liquid or gas mixture, and where the solid passes countercurrent to the net flow of liquid or gas. The control process of the invention is especially advantageous when applied in a process using a rotating-disc contactor, such as for removal of aromatics from a feed to a Friedel-Crafts isomerization process. It is well known that benzene has a deleterious effect on the activity of Friedel-Crafts catalysts, such as $AlCl_3$ and $AlBr_3$, which are used in the low temperature isomerization of normal butane, pentanes and hexanes. To prevent sludge formation and catalyst deactivation, the tolerance of benzene in a reactor of this type is in the order of 0.1% by weight benzene. Although the separation of aromatics can be accomplished by such methods as solvent extraction, extractive distillation, and low pressure hydrogenation with, e.g., noble metal catalysts, such operations are costly. Fractionation of the feed to remove benzene is impractical, as removal of benzene to the required level by this method would result in substantial losses of n-hexane and methyl pentanes because of the small differences in boiling points as well as azeotrope formation. Dunn et al. have discovered that benzene may be selectively removed from isomerization feedstocks by contacting the feed with a solid adsorbent such as silica gel in a rotating-disc contactor (RDC). This process is described in Belgian Patent 627,719, Sept. 18, 1963.

In this embodiment of the invention, rotating-disc contacting zones as described in Reman, U.S. 2,601,674, June 24, 1952, are employed in combination with a solid adsorbent slurry to selectively adsorb benzene from the isomerization feed. While the invention of Reman deals with liquid-liquid extraction system the device of the invention may be adapted for solid/liquid contacting. The present invention is particularly applicable to this process, since rotating-disc contactor performance is very sensitive to the presence of fines and change in flow. A slurry of silica gel in an essentially aromatic-free paraffin having 4–6 carbon atoms per molecule is maintained in a slurry storage zone, or sump, from which slurry is removed for use in the dearomatization process. Slurry concentrations may be adjusted, and makeup gel may be added to this zone. Slurry of desired concentration passes from the storage zone and, in accord with the invention, is diluted with recycle paraffin, passed through a throttling valve, and reconcentrated in an elutriator. Recycle liquid and entrained gel fines, which fines have been produced by wearing, chipping and cracking of the larger gel particles, are removed from the top of the elutriator and are passed to a fines settler, wherein the small gel particles are allowed to settle and are removed. The recycle liquid then passes through a pump, and a regulated amount of liquid is recombined with incoming slurry from the slurry storage tank. Reconcentrated slurry from the elutriator is then passed to a first rotating-disc contacting zone. Thus, the rate at which slurry is transferred from storage to the contact zone is controlled by the circulation system of the invention.

In the first rotating-disc zone, the silica gel-paraffin slurry is introduced near the top of the contacting zone. The gel falls through the upper or adsorption section of the zone and selectively adsorbs benzene from the upflowing feed which was introduced into a lower portion of the adsorption section. It is essential that the slurry contain an importantly low amount of fines, which would be swept overhead or would not maintain an adequate settling velocity for high process efficiency. The benzene-free feed passes overhead from the first rotating-disc contacting zone, the silica gel having adsorbed benzene on its surface. The slurry is then washed with a small stream of isomerizate-rich material in an exchange-wash section of the contactor, thereby minimizing bypassing of feed paraffins around the isomerization reactor. This exchange wash is described in detail in Belgian Patent 629,719 mentioned above.

The gel slurry leaves the first rotating-disc zone and is heated and passed into the upper section of a second rotating-disc contacting zone where an upflow of hot benzene-free isomerizate (product from the subsequent isomerization reaction) strips the benzene from the gel at about 275° F. The isomerizate and benzene are passed out of the desorption section and may be advantageously used in gasoline blending. In a lower section of the second rotating-disc zone, adsorbed isomerizate is displaced from the gel surface by a small stream of benzene-free feed paraffin obtained from the top of the first RDC.

Concentrated slurry is returned to the storage zone described above, and may optionally be passed through the flow control and fines removal steps of the invention before entering the storage zone.

We claim as our invention:

1. A method of controlling the flow rate of a slurry containing at least 3% by volume particulate solids comprising the following steps in sequence:
    (1) diluting the slurry with a recycle fluid,
    (2) throttling the diluted slurry,
    (3) separating the diluted slurry into a more concentrated slurry and a recycle fluid,
    (4) returning the recycle fluid to step (1), and
    (5) adjusting the throttling restriction of dilute slurry and the circulation flow rate of recycle fluid to obtain the desired transfer flow rate of process slurry.

2. The method of claim 1 wherein the recycle fluid of step (3) contains entrained solid fines and the fines are separated from the recycle fluid before returning the recycle fluid to step (1).

3. The method of claim 1 wherein the particulate solids comprise a catalyst.

4. The method of claim 1 wherein the particulate solids comprise an adsorbent.

5. The method of claim 1 wherein the process slurry contains about 3 to about 55% by volume particulate solids and the dilution with recycle fluid in step (1) is effected to obtain a concentration of from 1% to 20% volume particulate solids.

6. The method of claim 1 wherein the concentrated slurry of step (3) is essentially the same concentration as the undiluted process slurry.

7. A method of controlling the flow rate of transfer of a process slurry containing from about 7 to about 40% by volume particulate solids comprising the following segmented steps:
    (1) diluting the slurry with a recycle fluid to a concentration of from 1% to 20% volume particulate solid,
    (2) throttling the diluted slurry,
    (3) separating the diluted slurry into a concentrated slurry of essentially the same concentration of solids as the undiluted process slurry and a recycle fluid,
    (4) separating solid fines from the recycle fluid,
    (5) returning the recycle fluid from which solid fines have been removed to step (1), and
    (6) adjusting the throttling restriction of dilute slurry and the circulation flow rate of recycle fluid to obtain the desired transfer flow rate of process slurry.

8. In a sorption process for removing at least one component from a fluid which comprises passing in a contact zone a particulate solid sorbent in flow countercurrent to the net fluid flow, at least one component being removed on the sorbent, the sorbent particles being supplied to and removed from the contact zone as a slurry, the improvement therein which comprises controlling the flow of slurry by a method characterized by sequentially:
    (1) diluting the slurry with a recycle fluid,
    (2) throttling the diluted slurry,
    (3) separating the diluted slurry into a more concentrated slurry and a recycle fluid,
    (4) returning the recycle fluid to step (1), and
    (5) adjusting the throttling restriction of dilute slurry and the circulation flow rate of recycle fluid to obtain the desired transfer flow rate of process slurry.

9. The process improvement of claim 8 wherein flow of slurry is controlled by sequentially:
    (1) diluting the slurry with a recycle fluid to a concentration of from 1% to 15% volume particulate solid,
    (2) throttling the diluted slurry,
    (3) separating the diluted slurry into a concentrated slurry of essentially the same concentration of solids as the undiluted process slurry and a recycle fluid,
    (4) separating solid fines from the recycle fluid,
    (5) returning the recycle fluid from which solid fines have been removed to step (1), and
    (6) adjusting the throttling restriction of dilute slurry and the circulation flow rate of recycle fluid to obtain the desired transfer flow rate of process slurry.

References Cited

UNITED STATES PATENTS

| | | | |
|---|---|---|---|
| 2,654,479 | 10/1953 | Driessen | 210—195 X |
| 2,756,685 | 7/1956 | Hoogendonk | 302—14 X |
| 2,793,082 | 5/1957 | Gardner | 302—14 |
| 2,823,763 | 2/1958 | Maslan | 55—22 |
| 2,886,210 | 5/1959 | Cooper et al. | 302—14 X |
| 2,915,336 | 12/1959 | Vaell | 302—14 |
| 3,272,335 | 9/1966 | Nettel | 210—73 X |
| 3,325,011 | 6/1967 | Keller | 210—96 |

REUBEN FRIEDMAN, *Primary Examiner.*

C. DITLOW, *Assistant Examiner.*